Feb. 3, 1931.                R. O. DENT                1,791,124
                            TYPIST'S RULE
                          Filed Dec. 9, 1927
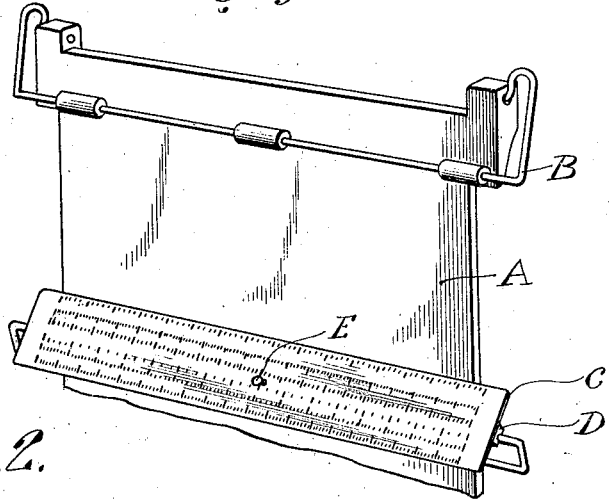
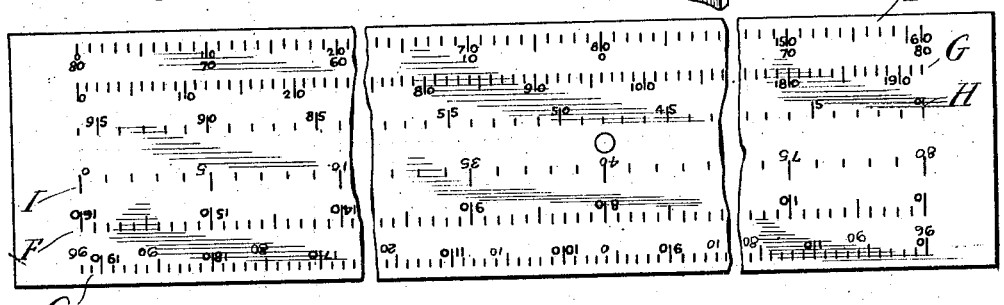
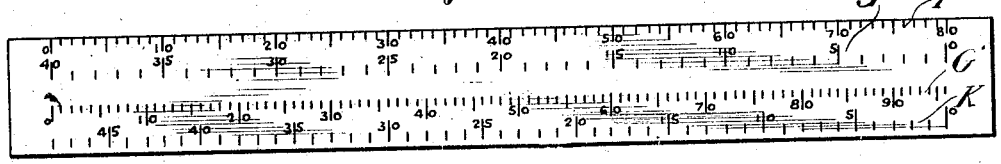
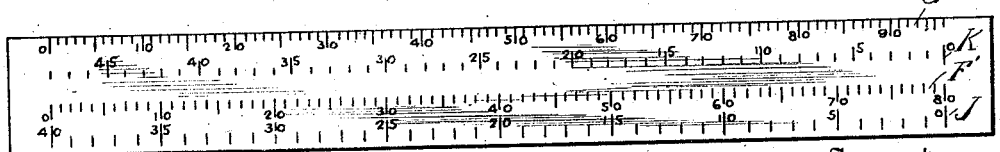
Inventor
Richard Orville Dent
By his Attorneys Patented Feb. 3, 1931

1,791,124

UNITED STATES PATENT OFFICE

RICHARD ORVILLE DENT, OF NEW YORK, N. Y.

TYPIST'S RULE

Application filed December 9, 1927. Serial No. 238,986.

My invention relates to a typist's rule or scale for use in centering headings and tabular matter accurately and in making accurate line and page copies of typewritten matter whether the reproduction be of the same size type as the matter being copied or of a different size type.

It is necessary frequently in copying typewritten matter to center headings accurately. In doing work of this character it is customary for typists to count the spaces covered by the heading which is to be centered and then, in order to determine at what distance from the margin of the work sheet the heading is to be started, to calculate the number of spaces from the center of the sheet equal to one-half of the number of spaces in the heading. Where the heading is to be positioned off center with respect to the center of the sheet still further mental calculations are necessary or else the typist must depend upon the accuracy of her judgment of space. This is also true when numbers or other matter are being filled in on a form divided by vertical rulings into a plurality of columns. All this is laborious, takes time, and reduces the possible amount of work which may be accomplished by a typist in a given period of time. The element of uncertainty of the mental calculations involved is also to be considered.

It is an object of the present invention to provide a simple and convenient means to indicate quickly, without counting, the number of characters and spaces in the line of title matter to be copied and the proper distance from the margin at which to start the heading in order to insure its centering.

A further object of the invention is to provide means which may be manipulated as an ordinary rule and which shows quickly, without calculation, the exact spacing of descriptive matter and headings and of columns, and the proper margins to be allowed.

A still further object of the invention is to provide means for quickly determining the proper centering, spacing and margins to be allowed when copying typewritten matter of larger or smaller size type than the type on the typewriter being used.

The invention may be embodied not only in a scale or rule of the ordinary form which may be applied to the matter being copied in any position with respect to the typewriter, but also in a scale attached to a copy-holding device of the types now in rather general use.

In the accompanying drawing Fig. 1 is a perspective view of a copy-holding device of a conventional type having associated therewith a centering scale embodying the principles of the present invention.

Fig. 2 is an enlarged detailed view of a scale similar to the one shown in Fig. 1.

Fig. 3 is a view of a slightly modified form of scale or rule.

Fig. 4 is a view of the reverse side of the rule shown in Fig. 3.

The reference character A designates a copy-holding device of the conventional type having the resilient bail B for holding typewritten or other written matter to be copied in a substantially upright position. Associated therewith and operatively connected thereto in a suitable known manner not shown is a guiding strip C adapted to press against the matter on the copy-holder A and to aid the typist in following the copy. It will be understood that the usual means are provided for moving the strip C and the holder A relatively to one another so as to bring the successive lines of the matter being copied into the line of sight. The strip C is provided with a plurality of scales or series of character-spacing indications described more fully below and is detachably secured to the bar or bail D by suitable means, for example, by means of a threaded pin and nut E.

The character-spacing indications on the strip C are shown more clearly in Fig. 2.

The letter F indicates a series of character-spacing indications spaced in accordance with the spacing of consecutive characters as written on a typewriter equipped with "pica" type, the indications being numbered consecutively from 0 to 160 from left to right. The second scale or series of character-spacing indications G are shown as spaced according to the spacing of the characters on a typewriter equipped with "elite" type, the numbering consequently running from 0 to 192. The third scale H comprises a series of centering indications spaced at distances apart equal to twice the distance between each of the indications in the adjacent scale G and numbered consecutively in increasing order of magnitude from a point in line with the highest number in scale G to a point in line with the 0 indication in scale G, or beginning with 0 in line with 192 in scale G, the scale H ends with 96 in line with 0 in scale G. Along the opposite edge of the strip C is arranged a second set of scales viewed more clearly by inverting the drawing. The first scale of this set, or the one adjacent the edge is the same as scale G and the second scale is the same as scale F of the first set. The third scale I of this set is a centering scale numbered from right to left as viewed with Fig. 2 inverted as is scale H but having the indications spaced at distances equal to twice that of the indications on the scale F, the numbering therefore starting at 0 at the right and terminating at 80 at the left. It will be understood that the scales shown in Figs. 1 and 2 in the copy-holding device to which they are applied are for use primarily with the so-called "wide-carriage" typewriter, but as far as the principle of the invention is concerned it is equally applicable to machines of the standard size which have the 80-space pica type or the 96-space elite type.

In using the scales shown in Figs. 1 and 2 in conjunction with a copy-holding device the matter to be copied is inserted in the copy-holder and the upper edge of the strip C is brought to a point just below the line to be copied. The copy will also be adjusted laterally so as to be centered with respect to the indications on the first scale, which will be F, if the copy is written in pica type, or G if matter written in elite type is being copied. In the latter case, of course, the strip C will be turned so as to bring the lower set of scales uppermost. To facilitate the centering of the copy in the holder the scales F and G at the respective top edges of the rule or strip C as shown in Fig. 2 may each be provided with a second numbering beginning at the character indication midway between the ends of the scale and proceeding by consecutive numbers toward both ends of the scale. In the case of scale F the numbering starts with 0 in register with 80 in the primary numbering of the scale and terminates with 80 in register with 0 at one end and with 80 in register with 160 at the other end. In the case of scale G the numbering starts with 0 in register with 96 in the primary numbering of the scale and terminates with 96 in register with 0 at one end and with 96 in register with 192 at the other end. With this numbering all that the typist needs to do to center the copy laterally on the holder is to see that the margins of the typewritten matter of the copy coincide with the same numbers at each end of the secondary numbering of the scale F or G as the case may be. This will avoid the necessity of a mental calculation to determine the points on the scale to insure like margins for the copy which would be required if only one set of numbers were applied to the scale.

If, for example, the line which has been brought into position to be copied is a heading twenty spaces long on the pica scale and it is desired to center this on a typewriter equipped with elite type the typist will determine the margin to be allowed on the elite machine to insure proper centering by noting the character indication in scale H which is in line with 20 in scale G, which in the example given would be number 86. Therefore, by starting at 86 on the typewriter scale the heading would be correctly centered.

In case it is not desired to relocate or center a heading differently from the way it appears in the matter being copied, it may be reproduced in the smaller type in the same relation to the other portions of the matter by first ascertaining the proper point of beginning on the elite scale according to the method above described, then shifting the matter to be copied laterally to the indicated point of beginning. For example, if the matter to be copied has a length equal to 140 spaces in the pica scale and it is to be reproduced in elite type, reference to the centering scale will show that the point of beginning will be at 26 on the elite scale. Therefore, to insure that the reproduction will be centered correctly the matter being copied will be so positioned in the copy-holder that the point of beginning will fall at 26 on the pica scale. Thereafter by merely following copy and starting all headings, tabulations, etc. at the same numerical designation on the elite typewriter as is indicated on the pica scale carried by the strip C, the component parts of the reproduction will bear the same relation to one another as in the original.

In Fig. 3 is shown one side of a rule embodying the principles of the present invention and designed to be applied directly to the matter being copied in whatever position it may be and which can be used in a number of ways, such for example, as determining the proper spacing and alignment of poorly set-up copy, relocation of headings, aligning of columns of figures and the like, as well as for the ordinary centering of matter to be copied on a machine equipped with a different size type than that of the matter being copied. The scale F' is the same as scale F in Fig. 2 except that it is numbered from 0 to 80, being designed for use with a typewriter equipped with the ordinary letter-size carriage. The second scale J is a centering scale numbered from 0 to 40 for use in combination with scale F' when centering or relocating copy matter on a typewriter equipped with the same size type as that in which the matter to be copied appears. Scale G' is similar to scale G except for length, the numbering terminating with 96. This scale likewise has associated therewith the centering scale K numbered from 0 to 48. Figure 4 shows the reverse side of this rule with the scales as shown in Fig. 3 but arranged in a different order, viz., G', K, F', J reading downwards. In utilizing the rule to reproduce matter appearing in one size type in type of different size, the same procedure will be followed as outlined in connection with the description of the scale shown in Fig. 2, the side of the rule shown in Fig. 3 being used when matter appearing in pica type is being copied on a typewriter equipped with elite type, and, vice versa, the side represented by Fig. 4 will be used when going from elite to pica. When the rule is being used for this purpose, of course, the first centering scale, i. e., scale J, when the side represented by Fig. 3 is being used, and the scale K, when the side represented by Fig. 4 is being used, will not be considered in making the proper determinations.

It will be understood that in the specific embodiment of the invention described above and illustrated in the drawings I have referred to a rule or scale as being used with pica or elite type merely for illustrative purposes. The invention is equally applicable for use in copying matter appearing in any other size of type and reproducing it in a different size type. In this case, it will, of course, be necessary to provide scales of the proper size and associate them in a similar manner.

In addition to the advantages hereinbefore pointed out it is to be noted that the measuring scales of my rule read from left to right, the natural way, which is a decided improvement over those scales which have heretofore been attached to the typewriter and numbered from right to left.

The rule is applicable not only in centering and relocating headings, in reducing the typewritten matter to copy form in different size type and all other various applications to straight copy matter, but also in copying manuscripts or partly interlined typewritten matter, since once the number of characters and intervening spaces have been counted the rule may be used to quickly determine the proper spacing or centering of the matter on the typewriter.

It will be understood that instead of arranging the two scales or sets of series of character indications on the same side of the strip C as shown in Figs. 1 and 2, one set may be placed on one side and one on the other, in which case changing from one side to the other may be accomplished by removing the nut E and turning the strip over.

Various changes in the details of the construction of the rule may be made without departing from the invention, which is not to be deemed as limited other than as indicated by the appended claims.

What I claim is:

1. A scale for locating typewritten matter on a worksheet comprising a series of character-spacing indications, spaced in accordance with the spacing of consecutive characters as written by a typewriter and numbered consecutively from left to right, and a series of centering indications, the distance between any two successive centering indications being twice that between two successive character-spacing indications, the indications of the two series being arranged in parallel with the successive centering indications in register with alternate character-spacing indications, the respective series being of equal length and the centering indications being numbered consecutively from right to left.

2. A rule having scale indications along one edge spaced in accordance with the spacing of consecutive characters as written on a typewriter equipped with a certain size of type, a second scale arranged in parallel relation to the first scale with the spacing of consecutive characters as written on a typewriter equipped with a different size of type, the indications of both series being numbered consecutively in the same direction of increasing order of magnitude beginning at a common origin, and a centering scale comprising a series of centering indications, the distance between any two successive centering indications being twice that between two successive character-spacing indications in the second scale, said centering scale being parallel to the second scale and numbered consecutively in the opposite direction to the numbering of the second scale, beginning at a point in register with the highest number in the second scale.

3. A rule having scale indications along one edge spaced in accordance with the spacing of consecutive characters as written on a typewriter equipped with certain size of type, a second scale arranged in parallel relation to the first scale with the spacing of consecutive characters as written on a typewriter equipped with a smaller size of type, the indications of both series being numbered consecutively in the same direction of increasing order of magnitude beginning at a common origin, and a centering scale comprising a series of centering indications, the distance between any two successive centering indications being twice that between two successive character-spacing indications in the second scale, said centering scale being parallel to the second scale and numbered consecutively in the opposite direction to the numbering of the second scale, beginning at a point in register with the highest number in the second scale.

4. A rule having two sets of scale indications thereon, each set comprising a series of centering indications and two series of character-spacing indications spaced relatively in accordance with the spacing of consecutive characters as written on typewriters equipped respectively with different size type, the indications of said two series of each set being numbered consecutively in the same direction of increasing order of magnitude beginning at a common origin, said series of each set being arranged in parallel relation and the series of centering indications of one set being adjacent the series of larger character-spacing indications for that set and the series of centering indications of the other set being adjacent the series of smaller character-spacing indications of that set, said respective series of centering indications being numbered consecutively in the opposite direction to the numbering and beginning at a point in register with the highest numbers in the series associated therewith, said sets being so positioned on the rule adjacent different edges thereof as to permit of application selectively as desired.

5. A rule having two sets of scale indications thereon, each set comprising a series of centering indications and two series of character-spacing indications, spaced respectively in accordance with the spacing of consecutive characters as written on typewriters equipped respectively with different size type, the indications of said two series of each set being numbered consecutively in the same direction of increasing order of magnitude beginning at a common origin, said sets being positioned on the rule adjacent different edges thereof, one of the sets having the larger one of the two series of character-spacing indications nearest one edge and the other set having the smaller one of the two series of character-spacing indications nearest the other edge, each of said outer series having a second scale numbered consecutively in both directions from zero taken at a point in register with the middle indication of its associated series, the series of each set being arranged in parallel relation and the series of centering indications of each set being adjacent the inner series of character-spacing indications, the distance between any two successive centering indications being twice that between two successive character-spacing indications of its adjacent series and numbered consecutively in the opposite direction to the numbering of its adjacent series and having its origin at the highest number thereof.

In testimony whereof, I have signed my name to this specification this 5th day of Dec., 1927.

RICHARD ORVILLE DENT.